US006929082B2

(12) United States Patent
Kataoka et al.

(10) Patent No.: US 6,929,082 B2
(45) Date of Patent: Aug. 16, 2005

(54) PARKING ASSIST APPARATUS FOR VEHICLE AND CONTROL METHOD OF SAME

(75) Inventors: Hiroaki Kataoka, Susono (JP); Hisashi Satonaka, Susono (JP); Seiji Kawakami, Susono (JP); Mitsuhiko Morita, Shizuoka-ken (JP); Tomohiko Endo, Toyota (JP); Katsuhiko Iwazaki, Shizuoka-ken (JP); Yoshifumi Iwata, Anjo (JP); Yuu Tanaka, Kariya (JP)

(73) Assignees: Toyota Jidosha Kabushiki Kaisha, Toyota (JP); Aishin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/336,407

(22) Filed: Jan. 6, 2003

(65) Prior Publication Data

US 2003/0150661 A1 Aug. 14, 2003

(30) Foreign Application Priority Data

Jan. 11, 2002 (JP) ........................................ 2002-005072

(51) Int. Cl.[7] ................................................ B60S 9/00
(52) U.S. Cl. .......................... 180/204; 180/199; 701/23
(58) Field of Search ................................ 180/199, 204; 701/23–26, 41–45; 340/436–438, 903, 932.2

(56) References Cited

U.S. PATENT DOCUMENTS 4,931,930 A * 6/1990 Shyu et al. .................... 701/36
6,059,063 A * 5/2000 Shimizu et al. ............. 180/204
6,097,314 A * 8/2000 Desens et al. ........... 340/932.2
6,102,147 A * 8/2000 Shimizu et al. ............. 180/204
6,275,754 B1 8/2001 Shimizu et al. ............... 701/41
6,483,442 B2 * 11/2002 Shimizu et al. .......... 340/932.2
6,611,744 B1 * 8/2003 Shimazaki et al. ........... 701/41

FOREIGN PATENT DOCUMENTS

| EP | 1 160 146 A2 | 12/2001 |
| EP | 1 170 171 A2 | 1/2002 |
| JP | A 3-14767 | 1/1991 |
| JP | A 10-114272 | 5/1998 |
| JP | 11-208420 | 8/1999 |
| JP | 2000-072019 | 3/2000 |
| JP | 2001-018821 | 1/2001 |
| JP | A 2001-106115 | 4/2001 |
| JP | 2001-180407 | 7/2001 |
| WO | WO 01/85496 A1 | 11/2001 |

* cited by examiner

Primary Examiner—Lesley D. Morris
Assistant Examiner—L. Lum
(74) Attorney, Agent, or Firm—Oliff & Berridge, PLC (57) ABSTRACT

In a parking assist apparatus that assists with moving, by automatic steering, a vehicle from an arbitrary stopping position to a target parking position set by the driver, a setting portion (i.e., a parking assist ECU) sets both a path from the stopping position to the target parking position and a steering operation necessary to bring the vehicle along that path. When this path cannot be set with the steering angle in the stopping position set as the initial steering angle, and when the path can be set with another steering angle as the initial steering angle, an instruction portion (i.e., a monitor or a speaker) instructs the driver to turn the steering wheel to this other steering angle.

10 Claims, 5 Drawing Sheets

PARKING ASSIST APPARATUS FOR VEHICLE AND CONTROL METHOD OF SAME

INCORPORATION BY REFERENCE

The disclosure of Japanese Patent Application No. 2002-005072 filed on Jan. 11, 2002 including the specification, drawings and abstract are incorporated herein by reference in its entirety.

BACKGROUND OF THE INVENTION

1. Field of the Invention

The invention relates to a parking apparatus for a vehicle that assists with driving of the vehicle to a target parking position by automatic steering.

2. Description of the Related Art

As an apparatus that assists a driver with parking a vehicle, art such as that disclosed in Japanese Patent Application Laid-Open Publication No. 3-14767 has been known. This a records a steering wheel operation from a predetermined position (i.e., a position from which the parking operation is started) until the vehicle reaches the target parking position. An automatic steering apparatus then regenerates the recorded steering wheel operation, thereby facilitating the parking operations thereafter.

With the foregoing apparatus, when the regenerating operation is set, the steering angle is returned to the neutral position before the vehicle starts moving in order to make the initial steering angle when regenerating the steering wheel operation match the initial steering angle of when the steering wheel operation was recorded. Depending on the path to the start-parking position (i.e., the position from which parking is to be started), however, the steering angle may be great at the start-parking position. In this case, the steering wheel is automatically turned suddenly before the vehicle starts to move, thereby possibly giving an inexperienced driver an unpleasant sensation. Also, when the steering wheel is turned while the vehicle is stopped, i.e., so-called stationary steering, more force is required to turn the steering wheel than is required when turning the steering wheel while the vehicle is moving. Accordingly, turning the steering wheel while the vehicle is stationary places a load on the steering system. Further, when the start-parking position and the direction of the vehicle when regenerating the steering wheel operation differ from the start-parking position and the direction of the vehicle when the steering wheel operation was recorded, the parking position after regenerating the steering wheel operation differs increasingly from the target position the greater the distance between the target parking position and the start-parking position. In this difference, the effect of the difference in the direction of the vehicle is particularly great.

SUMMARY OF THE INVENTION

Therefore, it is an object of the invention to provide a parking device that can more reliably guide a vehicle to a target parking position with a small load on the steering system and without giving the driver an unpleasant sensation.

In order to achieve the foregoing object, a parking assist apparatus, which is one aspect of the invention and which assists with moving a vehicle by automatic steering from an arbitrary stopping position to a target parking position, is provided with a setting portion and an instruction portion. The setting portion sets a path from the stopping position to the target parking position, as well as sets the steering operation necessary for the vehicle to follow that path. When the setting portion determines both that the path cannot be set with another steering angle in the stopping position and that the path can be set with another steering angle, the instruction portion issues an instruction was to instruct the driver to turn the steering wheel to other steering angle.

Also, when the setting portion has determined that the path from the stopping position to the target parking position cannot be set even if the steering angle in the stopping position is changed, the setting portion calculates another initial stopping position where the path to the target parking position can be set. The instruction portion then issues an instruction so as to instruct the driver to move the vehicle to the other initial stopping position.

Also, the parking assist apparatus may further be provided with a notification portion that notifies driver when the path from the current position to the target parking position is able to be set.

In addition, a control method of the parking assist apparatus includes the steps of determining whether the path to the target parking position with the current steering angle can be set; calculating, when the path cannot be set, another steering angle where the path can be set; and instructing the driver to turn the steering wheel to the other steering angle where the path can be set.

Moreover, the control method of the parking assist apparatus may further include the steps of calculating another initial stopping position where the path to the target parking position can be set when the other steering angle where the path can be set can be calculated; instructing the driver to move the vehicle to the other initial stopping position; and notifying the driver when the vehicle has reached the other initial stopping position.

DETAILED DESCRIPTION OF THE PREFERRED EMBODIMENTS

Hereinafter, the preferred embodiments of the invention will be described in detail with reference to the accompanying drawings. In order to facilitate understanding, like elements in the figures will be denoted by like reference numerals, and redundant descriptions thereof will be omitted.

Figure 1:
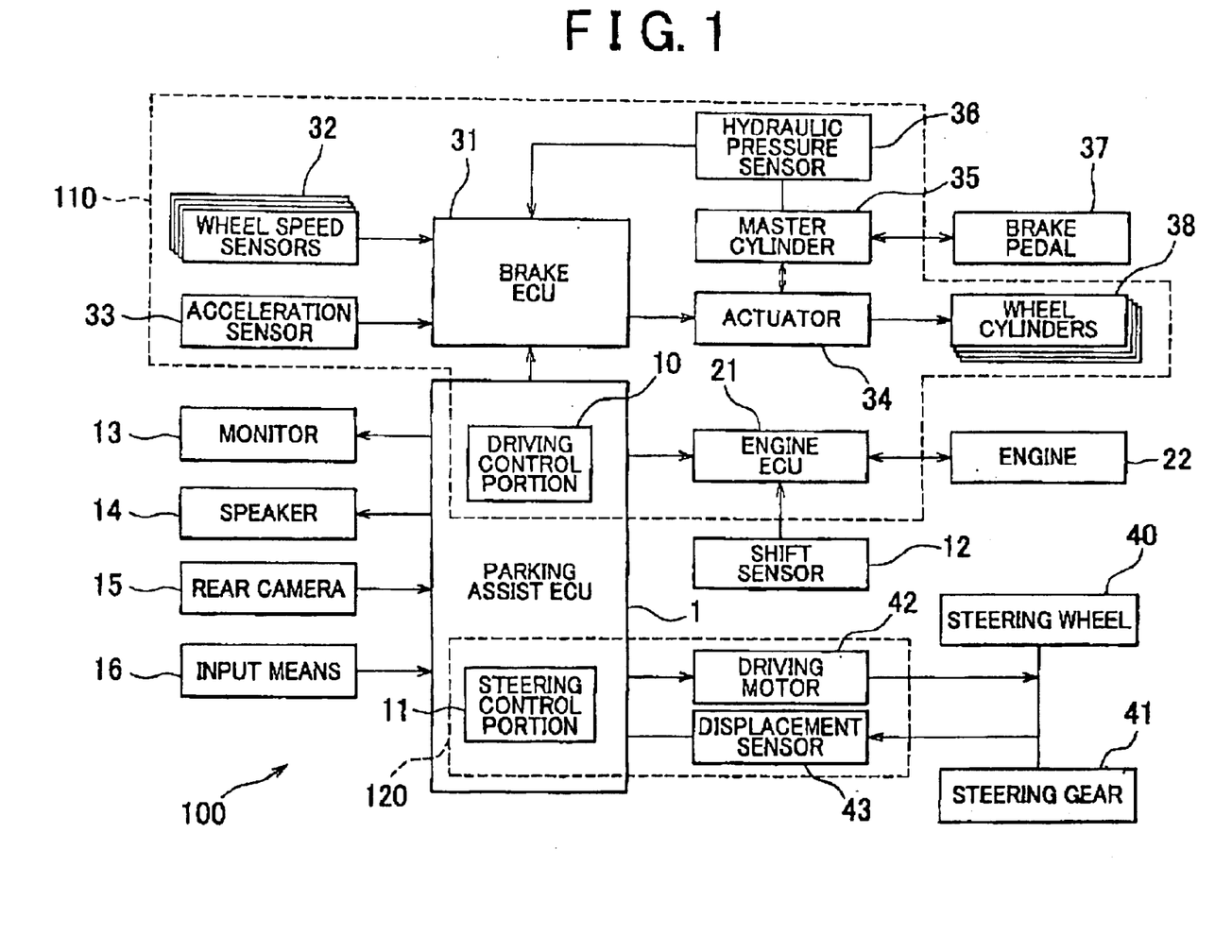
FIG. 1 is a block diagram schematically showing a parking assist apparatus according to the invention.

FIG. 1 is a block diagram of a parking assist apparatus 100 according to one exemplary embodiment of the invention. This parking assist apparatus 100 includes a driving control apparatus 110 and an automatic steering apparatus 120. The parking assist apparatus 100 is controlled by a parking assist ECU 1, which serves as a control apparatus. The parking assist ECU 1 also serves as a setting portion as setting means according to this invention. The parking assist ECU 1, which includes a CPU, ROM, RAM, an input signal circuit, an output signal circuit, a power source circuit and the like, also includes a driving control portion 10 that controls the driving control apparatus 110 and a steering control portion 11 that controls the automatic steering apparatus 120. The driving control portion 10 and steering control portion 11 may be categorized as hardware within the parking assist ECU 1, or as software which uses the sale CPU, ROM, RAM and the like as hardware.

The driving control apparatus 110 includes the driving control portion 10, a brake system, and a drive system. The brake system is an electronically controlled brake (ECB) system that electronically controls braking force applied to each wheel with a brake ECU 31. This brake system uses an actuator 34 to adjust the braking force by adjusting a brake hydraulic pressure that is applied to wheel cylinders 38 of a hydraulic brake disposed in each wheel.

Output signals from wheel speed sensors 32, an acceleration sensor 33, a group of hydraulic pressure sensors, and a master cylinder (M/C) hydraulic pressure sensor 36 are input to the brake ECU 31. The wheel speed sensors 32 are disposed in the wheels and detect a wheel speed thereof. The acceleration sensor 33 detects an acceleration of the vehicle. The group of hydraulic sensors, not shown, is disposed in the actuator 34, and detect a hydraulic pressure that is applied within the actuator 34 as well as to the wheel cylinders 38. The master cylinder (M/C) hydraulic pressure sensor 36 detects a hydraulic pressure of the master cylinder 35 that is disposed between the brake pedal 37 and the actuator 34.

An engine 22 that forms the drive system is controlled by an engine ECU 21. The engine ECU 21 and the brake ECU 31 control in cooperation by communicating with the driving control portion 10. Here, an output from a shift sensor 12 that detects a shift state of a transmission is input to the engine ECU 21.

The automatic steering apparatus 120 is provided with a driving motor 42, which also serves as a power steering apparatus provided between a steering wheel 40 and a steering gear 41, and a displacement sensor 43 that detects a displacement amount in the steering. The steering control portion 11 of the automatic steering apparatus 120 controls the driving of the driving motor 42 and receives an output signal from the displacement sensor 43.

A speaker 14 that provides information by voice and a monitor 13 are connected to the parking assist ECU 1 includes the driving control portion 10 and the steering control portion 20. The monitor 13 receives both an image signal from a back camera 15 that captures an image of an area in back of the vehicle, and an output signal from input portion 16 that receives operational input by the driver when parking assist is performed. The monitor 13 then refers that information to the driver via an image. According to this exemplary embodiment of the invention, the monitor 13 and the back camera 15 each make up an instruction portion as instructing means and an notification portion as notifying means.

Figure 2:
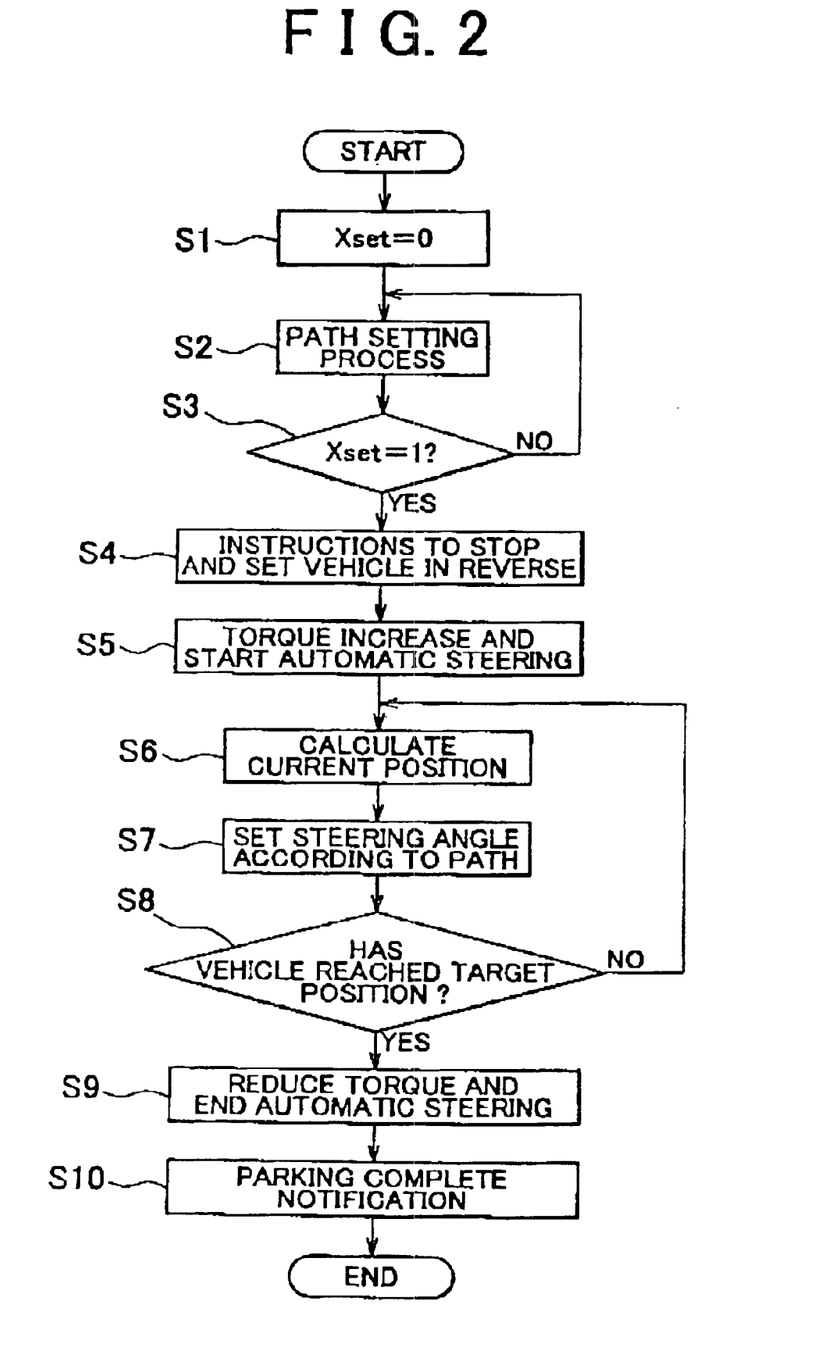
FIG. 2 is a flowchart showing a parking assist routine executed by the apparatus shown in FIG. 1.
Figure 3:
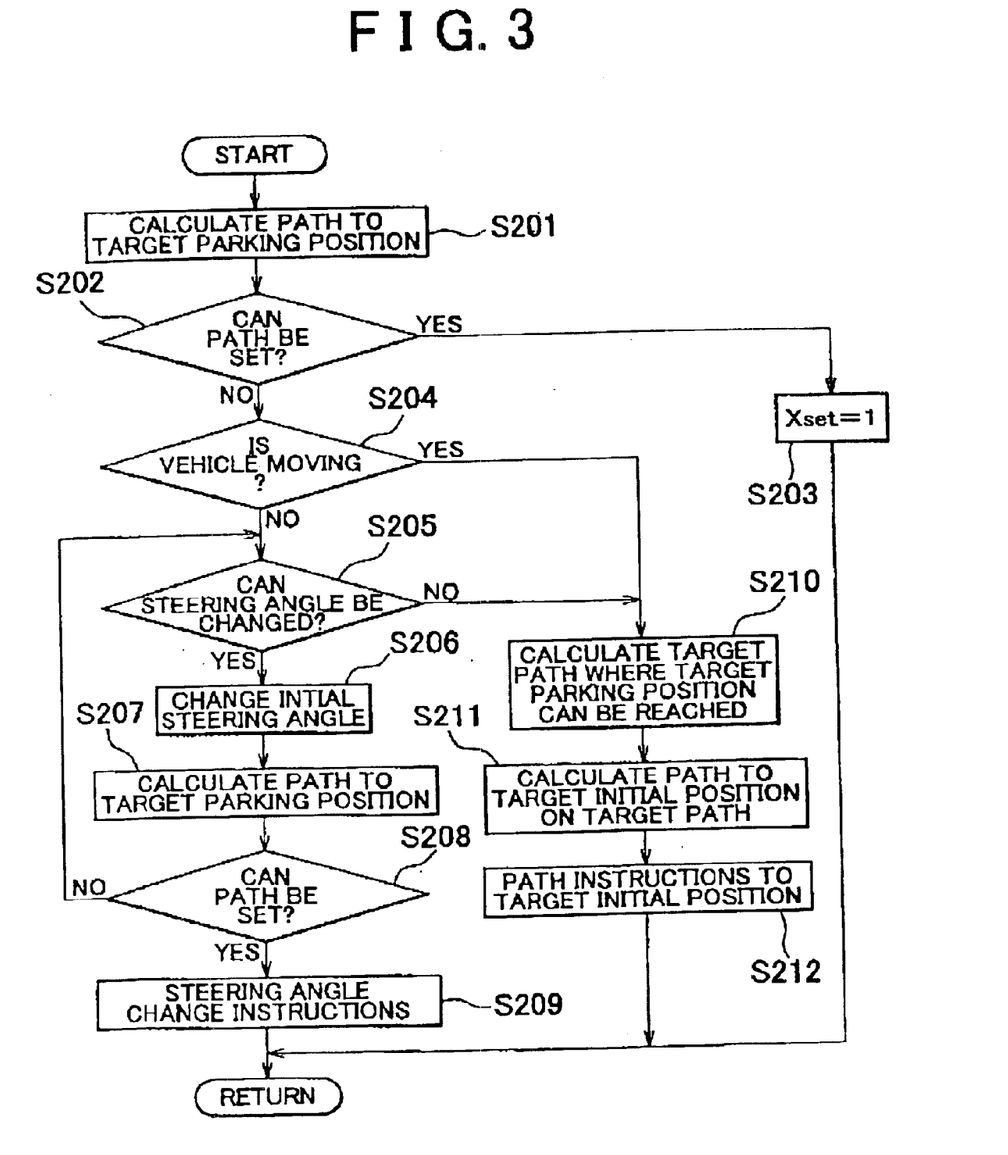
FIG. 3 is a flowchart showing a path setting process that executed in the routine shown in FIG. 2.
Figure 4:
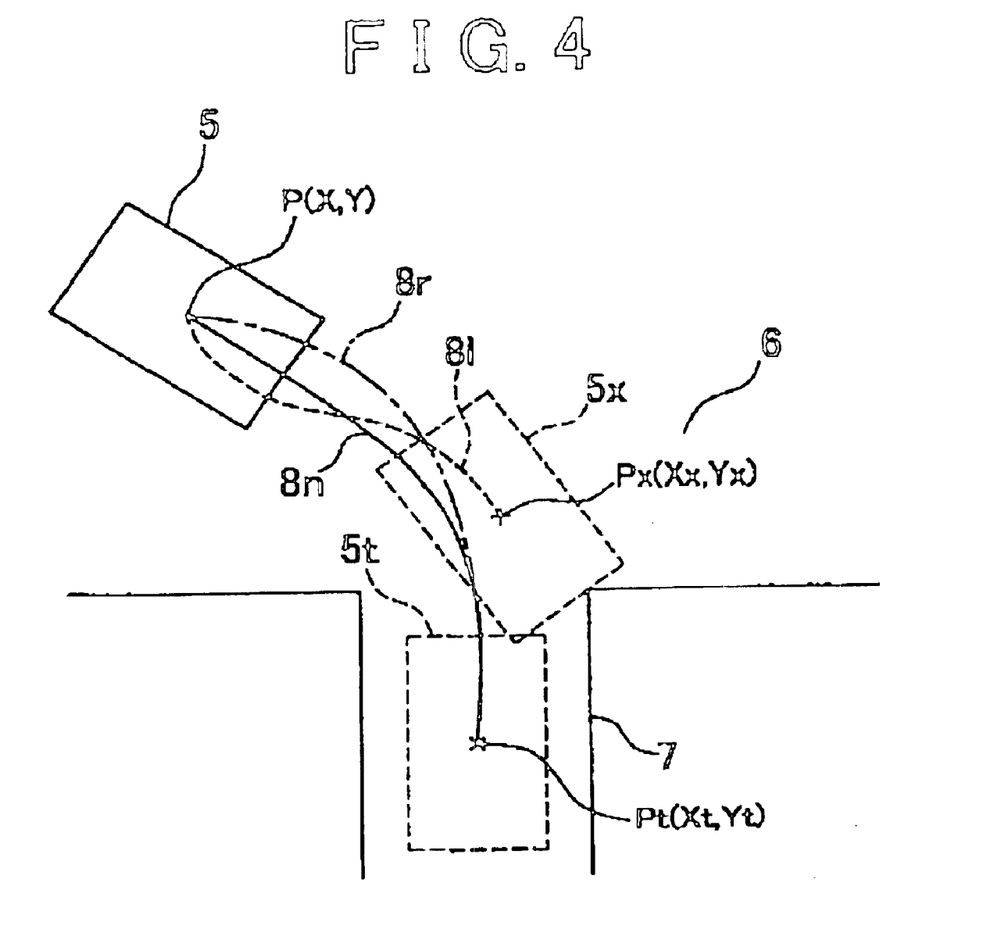
FIG. 4 is a diagram illustrating a path of a vehicle in setting the path in FIG. 3.
Figure 5:
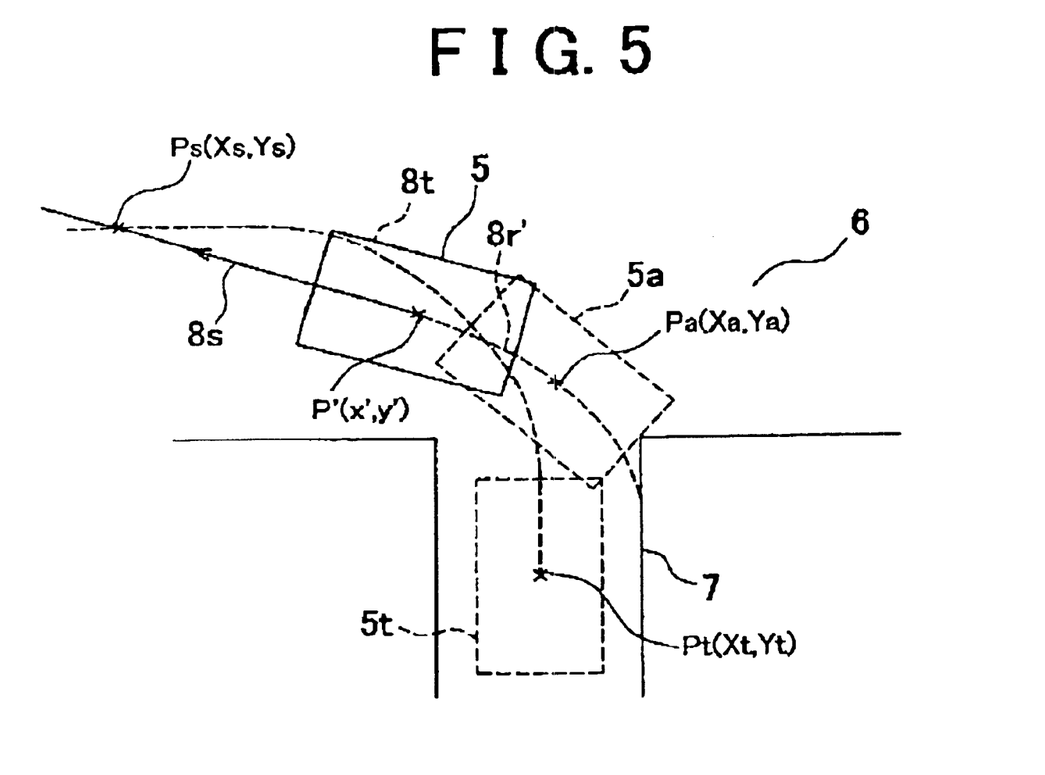
FIG. 5 is another diagram illustrating a path of the vehicle in setting the path in FIG. 3.

Next, a parking assist routine using the parking assist apparatus will be described in detail. FIG. 2 is a flowchart illustrating in detail the actual entire parking assist routine. FIG. 3 is a flowchart illustrating in detail a process within the routine shown in FIG. 2 for setting a path for parking. Further, FIGS. 4 and 5 are diagrams illustrating paths of the vehicle during this parking assist. Hereinafter, an example in which a vehicle 5 is being backed into a garage 7 that faces a road 6 will be described.

First, the vehicle 5 is moved into a position for starting a parking operation (hereinafter, referred to as "parking-start position"), shown in FIG. 4. The driver then puts the vehicle 5 in a parking assist mode by operating the input portion 16 while looking at the image captured by the back camera 15 that is displayed on the monitor 13. The driver then sets the target parking position by moving the parking frame on the screen of the monitor 13 to a position denoted by 5t in the figure. Hereinafter, the center point of the vehicle shall be denoted P(X, Y) and the center point of the target parting position 5t shall be denoted Pt(Xt, Yt).

When the 5t has been set, the parking assist ECU 1 starts the routine shown in FIG. 2. First, in step S1, the parking assist ECU 1 sets a path-to-parking-position-setting-complete flag Xset (hereinafter, simply referred to as "path setting complete flag Xset") to 0 as the initial value. When this path setting complete flag Xset is 1 it means that the path leading to the target position 5t has been set, and when the path setting complete flag Xset is 0 is means that the path has not been set.

Next, in step S2, the parking assist ECU 1 executes the process to set the path leading to the target position. Then in step S3, the parking assist ECU 1 checks the value of path setting complete flag Xset. When the value of the path setting complete flag Xset is 1 the process proceeds on to step S4, but when the value of the path setting complete flag Xset is 0 the process returns to step S2 and the path is set.

FIG. 3 illustrates in detail the contents of the process to set the path leading to the target position in step S2 in FIG. 2. In step S201, the parking assist ECU 1 obtains the path from the current position P(X, Y) to Pt(Xt, Yt). More specifically, an image recognition process is first executed to obtain the Pt(Xt, Yt) beforehand. Here, the target position Pt(Xt, Yt) may be obtained as relative coordinates that have the current vehicle position P(X, Y) as the point of origin, for example. Next, the parking assist ECU 1 obtains the path 8n of the center point of the vehicle that is optimal for leading from P(X, Y) to the target position Pt(Xt, Yt). At this time, a steering angle and steering operation amount with respect to the path that are able to be set by the automatic steering apparatus 120 are calculated.

In step S202, it is determined whether the path can be set. At the current position P(X, Y) of the vehicle 5 in FIG. 4, the path when the steering position is maintained in the neutral position is set as shown by a solid line 8n. Also, when the driver stops the vehicle 5 with the steering wheel turned all the way to the right, a path having a smaller turning radius than the path shown by the solid line 8n can be taken, as shown by a chain line 8*r*. In this case, the process has succeeded in setting the path so the process proceeds on to step S203, where the parking assist ECU 1 sets the path setting complete flag Xset to 1, after which the path setting process ends.

On the other hand, when the driver stops the vehicle 5 with the steering wheel turned all the way to the left, the path of the vehicle 5 would change to one that nears the target point Pt(Xt, Yt), as shown by a broken line 81. If the vehicle 5 were to follow this path shown by the broken line 81, however, the vehicle 5 would contact the edge of the garage 7 at the position Px(Xx, Yx) midway to the target position, thereby preventing the vehicle 5 from being able to be parked in the target position by taking that path. In this case, the parking assist ECU 1 determines in step S202 that the path is unable to be set and the process proceeds on to step S204.

In step S204, it is determined whether the vehicle is currently moving. When the vehicle is not moving, i.e., when the vehicle is stopped, the process proceeds on to step S205, where the parking assist ECU 1 determines whether the initial steering angle can be changed. This is determined by whether the steering wheel can be turned to the side where Px will approach the target point Pt, i.e., to the Pt side when viewed from Px.

When there is room for the steering wheel to turn in that direction, the process proceeds on to step S206, where the initial steering angle is changed to the determined side (i.e., the side near the target position Pt side) by a predetermined amount. In step S207, the parking assist ECU 1 recalculates the path to the target parking position Pt with the changed initial steering angle. Then in step S208, it is determined whether it is possible to set the recalculated path. When it has been determined that the path cannot be set, the process returns to step S205, where it is determined whether the vehicle 5 can be moved to the parking position from the current position by changing the steering angle. On the other hand, when it has been determined in step S208 that the path of the vehicle 5 to the parking position can be set by changing the steering angle, the process proceeds on to step S209. In step S209, the parking assist ECU 1 instructs the driver to change the initial steering angle the necessary amount to follow the obtained path by giving the driver directions such as, "Turn the steering wheel one-half rotation to the right." using the monitor 13 and the speaker 14. Then the press ends. In step S203 the path setting complete flag Xset will not be set to 1 until the steering angle has actually changed, after which the processes in step S201, step S202, and step S204 through step S209 are executed. Accordingly, the driver can more reliably change the initial steering angle to a steering angle which will enable the vehicle 5 to reach the target position Pt. Because this so-called "stationary steering" is done by the driver, only a small amount of driving force is needed from the driving motor 42 of the automatic steering apparatus 120, so the load on the steering system is able to be reduced. At this time, it is preferable that the driving motor 42 perform a power steering operation that will assist the steering operation by the driver. Further, because the driver is performing the steering operation, the steering wheel will not suddenly turn by itself when the vehicle 5 stops, such as with the art in Japanese Patent Laid-Open Publication No. 3-14767, and thereby does not give the driver an unpleasant sensation. Moreover, even when parking is not possible by just returning the steering wheel to the neutral position in the start-parking position, because the parking operation can be started from a state in which the steering wheel is turned to a large degree, the number of initial positions in which parking is possible is increased. Therefore, there is no need for the driver to accurately set the initial stopping position when starting the parking assist routine.

When the vehicle 5 is unable to reach the target parking position even with the steering wheel turned all the way to the parking position side, i.e., when it has been determined that the steering angle cannot be changed in step S205 after it has been determined that the path is unable to be set in step S202 or step S208, and when the vehicle 5 is moving, the process proceeds on to step S210. This is a case in which it is determined that parking is not possible due to the fact that the vehicle 5 will contact the edge of the garage 7 at a position Pa(Xa, Ya) even if it is headed toward the target parking position 5*t* along a path 8*r*′ which has the smallest turning radius from a current position P′(x′, y′) as shown in FIG. 5. In this case, the process proceeds on to step S210, where the parking assist ECU 1 calculates a target path 8*t* along which it is possible for the vehicle 5 to reach the target parking position Pt using the smallest turning radius by a reverse operation from the target parking position Pt. Then, in step S211, the parking assist ECU 1 obtains both a path 8*s* that leads to the target path 8*t* from the current position P′(x′, y′) and a point Ps(Xs, Ys) where that path 8*s* intersects with the target path 8*t*. For ease of calculation, it is preferable that this path 8*s* be obtained as an extension when the vehicle 5 proceeds with the current steering angle as it is or when the vehicle 5 proceeds with the steering wheel returned to the neutral position. The process then proceeds on to step S212, where the parking assist ECU 1 instructs the driver to move the vehicle 5 the necessary amount to follow the obtained path by giving the driver directions such as, "Move the vehicle ahead five meters." using the monitor 13 and the speaker 14. Then the process ends. When it is necessary to the change the steering angle, the parking assist ECU 1 may give the driver directions such as, "While returning the steering wheel to the right, move the vehicle ahead five meters." In step S203 the path setting complete flag Xset will not be set to 1 until the steering angle has actually changed, after which the processes in step S201, step S202, step S204, and steps S211 and S212 are executed. Accordingly, the driver is able to reliably move the vehicle 5 to an initial position from which it is possible for the vehicle to reach the target position Pt.

First, after the necessary steering angle change and path to the initial position have been calculated, it is preferable that the driver be notified by voice as to the state of the vehicle 5 while changing the steering angle or moving the vehicle 5. For example, when changing the steering angle, the driver may be given directions such as, "Continue turning the steering wheel for one-half rotation", and when moving the vehicle 5, the driver may be given directions such as, "Continue for three more meters." As a result, the driver is able to reliably operate the vehicle 5 to the obtained initial state.

Furthermore, when the vehicle 5 is stopped in the middle of the parking operation, the parking assist ECU 1 determines whether the automatic parking assist is possible by stationary steering with the vehicle 5 in that stopping position, and recalculates the path to the initial position in the event that the course has been changed partway through. Accordingly, it is possible to reliably guide the driver to an initial position and initial steering angle where parking assist is possible.

When the initial position and initial steering angle are such that they enable parking assist from the beginning, or when parking assist is made possible by the driver moving the vehicle and changing the steering angle, the path setting complete flag Xset is set to 1 and the process proceeds from step S3 to step S4.

In step S4, the driver is instructed to depress the brake pedal 37 and operate the shift lever so as to put the vehicle 5 into reverse. The parking assist apparatus stand-by until these conditions have been fulfilled. Then when the conditions have been fulfilled, in step S5, the driving control portion 10 of the parking assist ECU 1 instructs the engine ECU 21 to increase torque of the engine 22 and begins automatic steering. With this increase in torque, the rotation speed of the engine 22 becomes higher than when it is idling normally, so the engine 22 shifts to a torque increased state with a high driving force. As a result, the vehicle speed range adjustable by operation of only the brake pedal 37 expands without the driver operating the accelerator, thus controllability of the vehicle is improved.

Here, when the driver releases the brake pedal 37, a wheel cylinder hydraulic pressure (i.e., brake hydraulic pressure) applied to the wheel cylinders 38 by the actuator 34 is adjusted according to the pedal depression amount of the brake pedal 37, so that the braking force applied to each wheel is adjusted, thereby adjusting the vehicle speed. At this time, the brake hydraulic pressure applied to each of the wheel cylinders 38 is adjusted by the actuator 34 such that the vehicle speed detected by the wheel speed sensor 32 does not exceed the upper limit vehicle speed, i.e., braking force is applied to guard the upper limit vehicle speed. When there is an obstacle or a pedestrian or the like in the path of the vehicle 5 and the driver depresses the brake pedal 37, the brake ECU 31 controls the actuator 34 such that a corresponding braking force is applied to the wheel cylinders 38, thus enabling the vehicle to be slowed and stopped safely.

In step S6, the current position is calculated based on the change in the vehicle speed, the change in the acceleration, and the change in the steering angle. The change in the vehicle speed is obtained based on the wheel speed which is obtained by the wheel speed sensor 32. The change in the acceleration is obtained based on the acceleration which is obtained by the acceleration sensor 33. The change in the steering angle is obtained by the displacement sensor 43.

The steering control portion 11 controls the driving motor 42 to operate the steering gear 41 while monitoring the output of the displacement sensor 43 such that the steering angle matches a steering angle displacement in accordance with the position obtained by the parking assist ECU 1 (step S7).

In step S8, it is determined whether the current position P (i.e., the vehicle 5) has reached the target position Pt. For this determination, it may be determined whether the current position P is within a predetermined area somewhere around the target position Pt. The extent of that area may be set based on the accuracy of the image recognition of the image captured by the back camera 15, the determination accuracy of the current position obtained by the vehicle speed, acceleration and the like, and the steering accuracy of the automatic steering apparatus 120 and the like.

When it has been determined that the current position P (i.e., the vehicle 5) has not reached the target position Pt, the process returns to step S6 and repeats. Accordingly, the driver is able to move the vehicle 5 along the set path to the target position Pt without having to turn the steering wheel. Also, the driver is able to concentrate on checking the safety of the path ahead of the vehicle and adjusting the vehicle speed, thus simplifying the parking operation.

When it has been determined that the vehicle 5 has reached the target position Pt, the process proceeds on to step S9. In step S9, the driving control portion 10 instructs the engine ECU 21 to decrease the rotation speed of the engine 22, thereby reducing torque, and the steering control portion 11 ends automatic steering control. Further in step S10, the parking assist ECU 1 notifies the driver via the monitor 13 and speaker 14 that the vehicle 5 has reached the target parking position, and prompts the driver to set the shift lever in the park position and turn off the engine, after which the routine ends.

In the forgoing description, with the steering angle change, when the path to the target parking position cannot be set, the initial position where the path can be set is obtained and the driver is prompted to move the vehicle to that initial position. Alternatively, however, when it is determined that the vehicle cannot be moved to the target parking position from the current position even if the initial steering angle is changed, the system may notify the driver of that via the speaker 14 and prompt the driver to change the initial position. In this case as well, it is preferable to determine whether the path from the current position to the set target parking position is possible and inform the driver when it becomes possible while the vehicle is moving.

According to the invention as described above, when the parking assist is started and it is determined that the vehicle cannot reach the target parking position with the current steering angle by automatic steering, the initial steering angle with which the vehicle can reach the target parking position is obtained and the driver is prompted to change the steering angle to that initial steering angle. Accordingly, the vehicle is able to reliably reach the target parking position without increasing the load on the steering system.

Furthermore, when it has been determined that the vehicle cannot reach the target parking position by just turning the steering wheel, it is preferable that the driver by prompted to move the vehicle to the initial position, which further simplifies the parking operation.

What is claimed is:

1. A parking assist apparatus for a vehicle, which assists a driver with moving the vehicle from an arbitrary stopping position to a target parking position by automatic steering, the parking assist apparatus comprising:

a setting portion which sets a path from the stopping position to the target parking position and a steering wheel operation necessary for guiding the vehicle along that path; and an instruction portion which, when the setting portion determines that the path cannot be set with a steering angle in the stopping position and the path can be set with another steering angle in the stopping position, instructs the driver to turn the steering wheel to the other steering angle in a state where the vehicle is stopped.

2. The parking assist apparatus according to claim 1, wherein:

the setting portion calculates, when the setting portion has determined that the path from the stopping position to the target parking position cannot be set even if the steering angle in the stopping position is changed, another initial stopping position where the path to the target parking position can be set; and the instruction portion issues an instruction so as to instruct the driver to move the vehicle to the other initial stopping position.

3. The parking assist apparatus according to claim 2, wherein the setting portion monitors a position of the vehicle moved by the driver after the instruction has been given, further comprising a notification portion that notifies the driver when the vehicle position has reached the other initial stopping position.

4. The parking assist apparatus according to claim 2, wherein:

the other initial stopping position is a position where the vehicle can reach the target parking position with the shortest turning radius of the vehicle.

5. The parking assist apparatus according to claim 3, wherein:

the notification portion is at least one of a monitor and a speaker.

6. The parking assist apparatus according to claim 1, wherein:

the instruction portion is at least one of a monitor and a speaker.

7. The parking assist apparatus according to claim 1, wherein:

the setting portion instructs the engine of the vehicle to increase torque when the vehicle moves along the path.

8. A control method of a parking assist apparatus for a vehicle, which assists a driver with moving the vehicle from an arbitrary stopping position to a target parking position by automatic steering, the control method comprising the steps of:

determining whether a path to the target parking position can be set with a current steering angle;

calculating, when the path cannot be set, another steering angle in the stopping position that can be set; and instructing the driver to turn a steering wheel to the other steering angle that can be set in a state where the vehicle is stopped.

9. The control method according to claim 8, further comprising the steps of:

calculating another initial stopping position where the path to the target parking position can be set when the other steering angle that can be set cannot be calculated; and instructing the driver to move the vehicle to the other initial stopping position.

10. The control method according to claim 9, further comprising the step of:

notifying the driver that the vehicle has reached the other initial stopping position.

* * * * *

UNITED STATES PATENT AND TRADEMARK OFFICE
CERTIFICATE OF CORRECTION

PATENT NO. : 6,929,082 B2
APPLICATION NO. : 10/336407
DATED : August 16, 2005
INVENTOR(S) : Hiroaki Kataoka et al.

It is certified that error appears in the above-identified patent and that said Letters Patent is hereby corrected as shown below:

ON THE COVER PAGE:

(75) Column 1, please change the 4$^{th}$ inventor's city from "Shizuoka-ken" to --Suntou-gun--.

(75) Column 1, please change the 6$^{th}$ inventor's city from "Shizuoka-ken" to --Suntou-gun--.

Column 1, (73) Assignees: Please replace the second Assignee with the following:

--Aisin Seiki Kabushiki Kaisha, Kariya, Japan--.

Signed and Sealed this

Fifteenth Day of August, 2006

JON W. DUDAS
*Director of the United States Patent and Trademark Office*